United States Patent [19]

Hartmann et al.

[11] Patent Number: 4,986,004
[45] Date of Patent: Jan. 22, 1991

[54] METHOD AND APPARATUS FOR MEASURING THE CONFIGURATION OF CYLINDER BORES IN WORKPIECES

[75] Inventors: Rudolf Hartmann, Karlsbad-Auerbach; Knud Overlach; Günter Suchanek, both of Ettlingen, all of Fed. Rep. of Germany

[73] Assignee: PAT Messtechnik GmbH, Karlsruhe, Fed. Rep. of Germany

[21] Appl. No.: 460,501

[22] Filed: Jan. 3, 1990

[30] Foreign Application Priority Data

Jan. 4, 1989 [DE] Fed. Rep. of Germany ....... 3900106

[51] Int. Cl.$^5$ .................................................. G01B 7/12
[52] U.S. Cl. ...................................... 33/555.1; 33/552; 33/557; 33/544.2
[58] Field of Search ...................... 33/555.1, 556, 557, 33/558, 542, 544, 544.1, 544.2, 544.3, 544.4, 549, 550, 552, 555

[56] References Cited

U.S. PATENT DOCUMENTS

3,863,353 2/1975 Saari ....................................... 33/542
4,872,269 10/1989 Sattmann ........................... 33/544 X Primary Examiner—Harry N. Haroian
Attorney, Agent, or Firm—Max Fogiel

[57] ABSTRACT

For the purposes of measuring the configuration of cylinder bores, at least one measuring probe with a plurality of measuring sensors each having respective radially projecting sensing pins is introduced into the cylinder bore, without the sensing pins touching the cylinder bore, and the sensing pins are then brought into contact with the cylinder wall by relative displacement of the workpiece and the measuring probe with respect to each other. Thereupon the measuring head is fixed with respect to the workpiece and that fixing is maintained by means of a biasing force, whereupon, with the workpiece resiliently seated and with the measuring head decoupled from members which produced the advance movement thereof, the configuration of the cylinder bores is measured by sensing by means of the sensing pins on adjacent parallel circles. The apparatus has at least one measuring probe but preferably a plurality of measuring probes which are arranged in terms of number and position in accordance with the cylinder bores to be measured, the measuring probe or probes being associated with a measuring head which can be decoupled in the measuring position.

17 Claims, 5 Drawing Sheets

METHOD AND APPARATUS FOR MEASURING THE CONFIGURATION OF CYLINDER BORES IN WORKPIECES

The invention relates to a method of measuring the configuration of cylinder bores in workpieces, in particular cylinder bores in engine blocks of internal combustion engines, and an apparatus for carrying out the measuring method.

The company publication 'Incometer-System' from BBC PAT Messtechnik GmbH already discloses an apparatus for simultaneously measuring cylinder bores which extend in parallel-axis adjacent relationship in engine blocks of internal combustion engines. That machine is for checking the cylinder bores in mass-produced engine blocks.

In that machine, a conveyor system for supplying and removing the engine blocks extends through a measuring station within a portal structure, and a measuring head which is arranged on a transverse carrier member or beam of the portal structure and which has measuring probes which are arranged in parallel-axis relationship with each other, to correspond in terms of number and position to the cylinder bores to be measured, can be moved towards an engine block which is carried in the proper position on a workpiece receiving means in the measuring station, in such a way that the measuring probes engage into the cylinder bores in the engine block. The measuring probes are operatively connected to rotary drives and are provided with measuring sensors which are arranged at spacings from each other in the longitudinal direction of the probe, each measuring sensor having a respective sensing pin which projects radially beyond the peripheral surface of the probe.

That apparatus is used to measure the cylinder bores of engine blocks which are carried in the proper postion on a workpiece receiving means in the measuring station and which are fixed in a precise position, by a procedure in which the radially projecting sensing pins of the measuring sensors of the measuring probes which are introduced into the cylinder bores sense the cylinder walls on adjacent circular paths and in so doing detect the configuration and position of the cylinder bores.

Cylinder bores of that nature must be extremely accurate with manufacturing tolerances in the $\mu$m-range. Accordingly the requirements in regard to accuracy when measuring cylinder bores of that kind are also very high.

Taking the previously known measuring technology as its basic starting point, the underlying object of the present invention is to provide a measuring method which satisfies those requirements in respect of accuracy, and an apparatus which is used for carrying out the method and which is suitable for that purpose.

In regard to the method, that object is attained in that at least one measuring probe of a measuring head, which probe is provided with measuring sensors which are arranged at spacings from each other in the longitudinal direction of the probe and which have sensing pins which project radially beyond the peripheral surface of the probe, is introduced into a cylinder bore in a workpiece without contact between the sensing pins and the cylinder wall, then the sensing pins are brought into contact with the cylinder wall by relative displacement of the workpiece and the measuring probe relative to each other transversely with respect to the axis of the cylinder bore, thereupon the measuring head is fixed with respect to the workpiece and that fixing is maintained by means of a biasing force which urges the measuring head and the workpiece into their mutual fixing position, and then, with the workpiece being resiliently seated and with the measuring head being decoupled in relation to other apparatus members and only being precisely fixed to the workpiece, the configuration of the cylinder bores is measured by sensing of the cylinder wall by means of the sensing pins on adjacent parallel circles.

Instead of a measuring head with only one measuring probe which is adapted to be introduced into a cylinder bore, that measuring method can also be used for the simultaneous measurement of adjacent cylinder bores, by using a measuring head with measuring probes which are arranged with respect to number and position in accordance with the cylinder bores which are to be simultaneously measured in a workpiece.

Accordingly, characterising considerations of the measuring method according to the invention are that, during the measuring operation, the measuring head and the workpiece are fixed relative to each other and are held in that fixing position solely by a defined biasing force, wherein the workpiece is resiliently seated in the measuring station and the measuring head is decoupled from other apparatus members. That procedure practically completely eliminates the effects of errors and flaws due to external factors giving rise to vibration and oscillations.

The apparatus for carrying out the measuring method in accordance with the invention has a measuring head which can be advanced in a measuring station towards a workpiece receiving means, the measuring head having at least one measuring probe which is operatively connected to a rotary motor drive of a drive unit and which is provided with measuring sensors arranged at axial spacings from each other, each having a respective sensing pin which projects radially beyond the peripheral surface of the probe, while the probe can be introduced into a cylinder bore in a workpiece which is carried on the workpiece receiving means in the measuring station, and the workpiece receiving means is resiliently seated in the measuring station during the measuring operation. The measuring head and the workpiece receiving means are also movable relative to each other transversely with respect to the axis of the cylinder bores to bring the sensing pins of the measuring sensor into contact with the wall of the cylinder bore, while the arrangement also has means for mutually fixing the measuring head and the workpiece under the effect of a defined biasing force, with simultaneous decoupling of the measuring head from other apparatus members.

In accordance with the procedure laid down by the above-specified method, an apparatus of the above-indicated configuration can be used to measure cylinder bores and spaces, in a condition in which the measuring head and, in view of the resiliently seating of the workpiece receiving means, also the workpiece, are decoupled, thereby eliminating external influences which could give rise to errors and flaws.

An advantageous development of the invention provides that the measuring head is provided with positioning means which positively cooperate with the workpiece in the measuring position of the measuring probe, and with spacer means which are supported at selected points on the workpiece and which ensure precise and reproducible positioning of the measuring probe on the workpiece.

The positioning means may be index pins which can be fitted into index bores in the workpiece. In that connection, the index pins may be operatively connected to pneumatically, hydraulically or electromechanically operating actuating means. On the other hand the spacer means may be in the form of spacer pins which extend in parallel-axis relationship with respect to the measuring probe and which, when the measuring probe is in the measuring position, bear against selected and precisely machined contact regions of the workpiece.

In still another development of the apparatus the measuring head is suspended on a vertically movable upper portion of the apparatus by way of decouplable holding elements which in the decoupled condition permit limited positioning movements of the measuring head transversely with respect to the longitudinal extent of the measuring probe, while there are also provided means for pressing the measuring head against the workpiece with a defined biasing force when the holding elements are in a decoupled condition. In view of the limited transverse mobility of the measuring head, it is easily possible for the measuring probe to be introduced into the cylinder bores to be measured, without the sensing pins contacting the cylinder walls. The sensing pins first come into contact with the cylinder walls by virtue of a transverse displacement of the measuring head, when the measuring head is properly positioned relative to the workpiece and the index pins are brought into engagement with the index bores in the workpiece.

In that connection it has been found advantageous for the means for applying a biasing force for pressing the measuring head against the workpiece in the measuring position to comprise springs which in the measuring position are compressed by a predetermined amount, and thereby put in a prestressed condition, by pressure portions which are arranged on the movable upper portion of the apparatus.

It has also been found to be advantageous for each holding element to include a holding stirrup member which is connected to the measuring head in positively fixed relationship in the direction of advance movement towards the workpiece but limitedly transversely displaceably against the force of return means, and a coupling member which is fixedly connected to the movable upper portion of the apparatus and co-operates in positively fixed relationship with the holding stirrup member until the measuring head is applied to the workpiece and, upon further downward movement of the upper portion, comes out of engagement with the holding stirrup member. The return means which oppose the limited transverse movements of the holding stirrup members may be return springs which laterally engage the holding stirrup members and which are supported on the other hand on the measuring head.

Still a further embodiment of the invention provides that the pressure portions are in the form of coupling members co-operating with the holding stirrup members, wherein a pin of each coupling member, which pin is fixedly connected to the vertically movable upper portion of the apparatus, passes through an opening in an upper web portion of the holding stirrup member co-operating therewith, and a holding plate portion which is connected to said pin engages into a mounting seat around the opening in the underside of the web portion, but when the measuring head is in the measuring position, as a result of further downward movement of the upper portion, the holding plate portion comes out of the mounting seat in a downward direction. That arrangement may comprise, accommodated within the holding stirrup members, between the measuring head and the associated holding plate portion, a respective spring for urging the holding plate portion into its mounting seat, as the means for applying the biasing force for pressing the measuring head against the workpiece in the measuring position.

In accordance with another configuration of the invention, instead of only one measuring probe, the measuring head may also be provided with measuring probes which are arranged in terms of number and position in accordance with the cylinder bores in the workpiece to be measured, that is to say for example the measuring head may have four or six measuring probes when it is designed for measuring engine blocks. The measuring probes are then desirably accommodated with their associated drive units in a bridge support which in turn is decouplably and limitedly transversely displaceably suspended on the vertically movable upper portion of the apparatus.

Finally, a still further embodiment of the invention is characterised by a workpiece carrier which accommodates the workpiece and which in the measuring station stands on a support plate which in turn is resiliently seated, the workpiece carrier then being mounted in a precision seat on the support plate.

In addition, an embodiment of the apparatus according to the invention is characterised by a means for conveying the workpiece carrier with a workpiece carried thereon from a loading and/or unloading station to the measuring station and vice-versa, in the form of a turntable with a vertical axis of rotation, between said stations, which turntable can be lowered out of a transportation plane and which in its position in the transportation plane accommodates the workpiece carrier in suspended relationship in a precision seat in the region of an opening in the table while in the lowered position of the turntable the workpiece carrier is accommodated in the measuring station by the precision seat of the support plate and in the loading and/or unloading station, in the condition of being decoupled from the turntable, the workpiece carrier stands on a base plate.

An arrangement which guarantees that the workpiece carrier is supported in a particularly precise manner provides that the precision seats on the support plate and the turntable are in the form of taper mounting means and the workpiece carrier has mounting regions of opposite taper configuration which are respectively adapted to the taper mounting means and which are arranged at a vertical spacing from each other.

An embodiment of an apparatus according to the invention which will be described in greater detail hereinafter is illustrated in the accompanying diagrammatic drawings in which.

Figure 1:
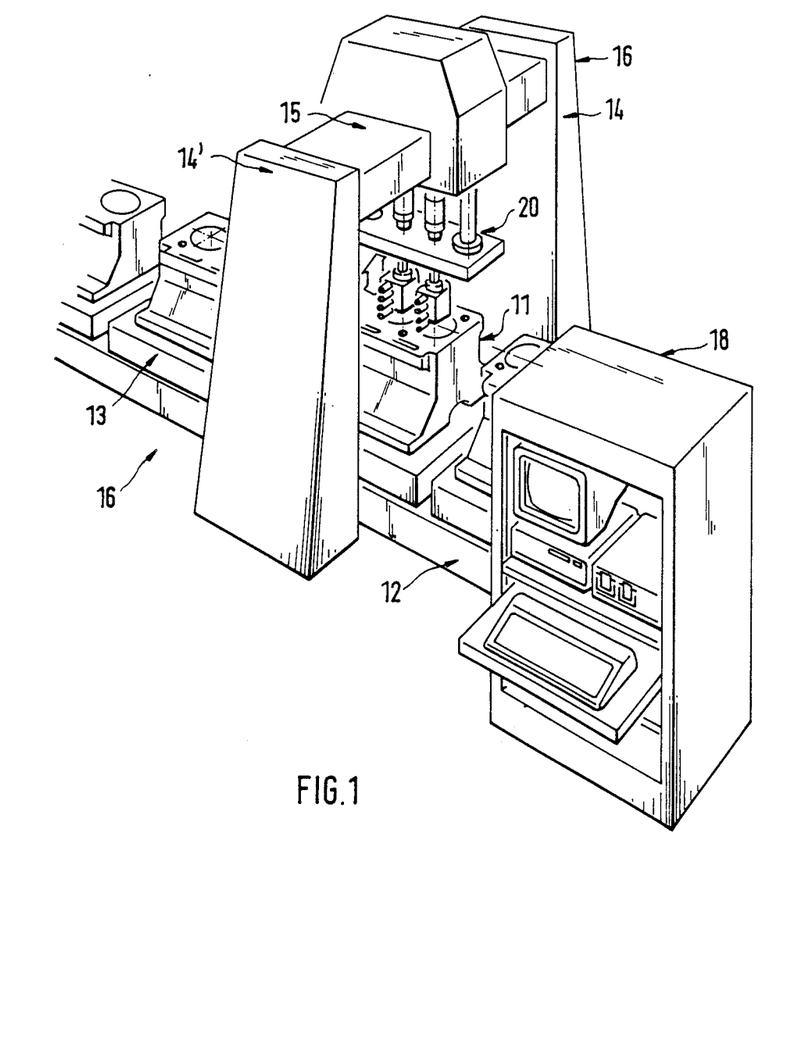
FIG. 1 is an overall perspective view of a measuring apparatus according to the invention for measuring the cylinder bores in engine blocks in a measuring station with a measuring head which is vertically movable and which can be lowered on to an engine block accommodated in the measuring station.

The apparatus 10 which is shown in its generality in FIG. 1 is used for simultaneously measuring the cylinder bores in engine blocks 11 for internal combustion engines, which are supplied to the measuring station 13 of the apparatus by means of a conveyor device 12 in a manner which does not concern us herein at the present time, and are transported away from the measuring station again after the measuring operation has been performed. The measuring station is arranged between two lateral supports 14 and 14', which are connected together at their upper ends by a transverse beam member 15, forming a portal structure 16 of great rigidity. The conveyor device 12 which is only indicated in the drawing extends through the above-mentioned measuring station 13. The apparatus 10 also has a measuring head 20 which is arranged above the measuring station on the transverse beam member 15 which interconnects the lateral supports 14 and 14' of the portal structure 16. The measuring head 20 is movable vertically and can be lowered on to a respective engine block which is accommodated in the measuring station. FIG. 1 also illustrates a control and evaluation unit 18 which does not interest us further in this context and which is arranged laterally of the portal structure 16 with the measuring station and the measuring head 20 which can be lowered towards the latter.

Figure 2:
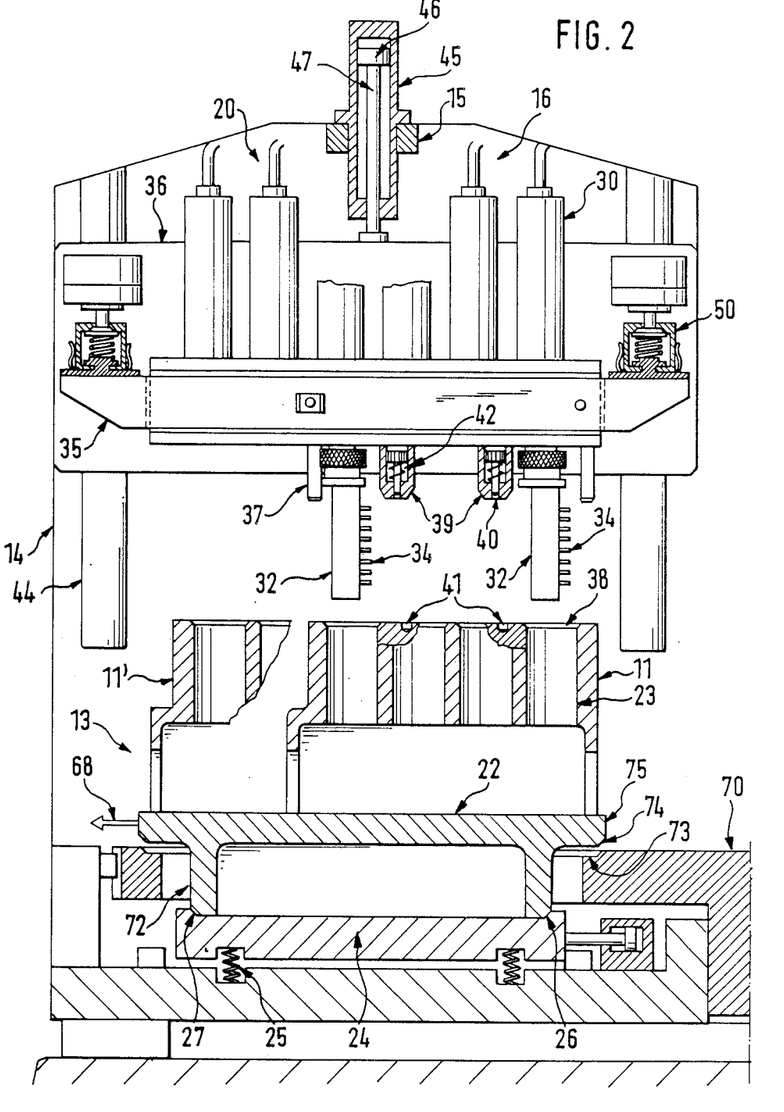
FIG. 2 is a view on a larger scale than FIG. 1 of part of the measuring station with an engine block accommodated on a workpiece carrier and showing the measuring head with a plurality of measuring probes prior to the introduction thereof into the cylinder bores in the engine block.

FIG. 2 is a sectional view illustrating an engine block 11 which is accommodated in the measuring station 13 on a workpiece carrier 22 and which is properly positioned in a manner not illustrated in the drawing. The engine block 11 has four cylinder bores 23 which extend parallel to each other and which are arranged at spacings from each other. Instead of an engine block having four cylinder bores, the engine block could also have six cylinder bores, as indicated at 11'. The workpiece carrier 22 can be moved into the measuring station 13 in a manner which will be described in greater detail hereinafter, and stands on a support plate 24 which is resiliently seated in the measuring station and which is supported on a base plate of the apparatus by means of buffer elements 25 which are only indicated in the drawing. The workpiece carrier 22 is provided with lower taper mounting surfaces and the support plate 24 is provided on its top side with taper mounting surfaces, the taper mounting surfaces being indicated at 26 and 27. The mounting surfaces 26 and 27 ensure that the workpiece carrier and therewith the engine block carried thereon can be reproducibly and precisely positioned in the measuring station.

FIG. 2 also shows that the measuring head 20 which is disposed above the engine block 11 carried on the workpiece carrier 22 has six drive units 30, each with a measuring probe 32 which extends away from same at the underside thereof. It will be appreciated that only two measuring probes are illustrated in the drawing. Each measuring probe 32 is mounted in overhung relationship on the associated drive unit and extends in a cantilever configuration downwardly therefrom. Eight measuring sensors are arranged at spacings from each other in a distributed array over the length of each measuring probe, each measuring sensor having a respective sensing pin 34 which projects radially beyond the peripheral surface of the probe.

The measuring head 20 includes a bridge support 35 which is carried on an upper portion 36 of the apparatus in such a way that it can be decoupled in a manner to be described hereinafter. The bridge support 35 carries the drive units 30 with the downwardly extending measuring probes 32 in juxtaposed relationship at the same spacings from each other as the cylinder bores 23 to be measured in the engine blocks 11. Extending from the bridge support 35 at the underside thereof, in parallel-axis relationship with the measuring probes, are spacer pins 37 which are adapted to bear against a precisely machined upper edge 38 of the engine block, and also index pins 40 which are accommodated in pneumatically or hydraulically actuable displacement units 39 and which serve for proper positioning of the measuring head 20 when it is lowered on to the engine block with measuring probes 32 engaged into the cylinder bores to be measured. In the measuring position, the index pins 40 engage into index bores 41 which extend into the engine block from the top surface thereof. The displacement units 39 are provided with return springs 42 which are compressed when the index pins are moved into their indexing positions and which return the index pins to their original positions after the displacement force is removed.

The upper portion 36 of the apparatus, which carries the measuring head 20, is vertically movably carried in vertically extending guides 44 which are arranged on the lateral supports of the portal structure 16. The downward movement of the upper portion 36 of the apparatus, with the measuring head 20, is produced by a pneumatically actuable operating cylinder 45 which is fixedly connected to the transverse beam member 15 of the portal structure 16 and which has a piston 46 which can be selectively acted upon by pneumatic fluid at its front side and at its rear side. The piston rod 47 of the piston 46 is fixedly connected to the upper portion 36 of the apparatus. The bridge support 35 of the measuring head, which carries the drive units 30 with the measuring probes 32, is suspended on the vertically movable upper portion 36 of the apparatus by means of decouplable holding elements 50, at the mutually remote ends of the bridge support 35.

Figure 3:
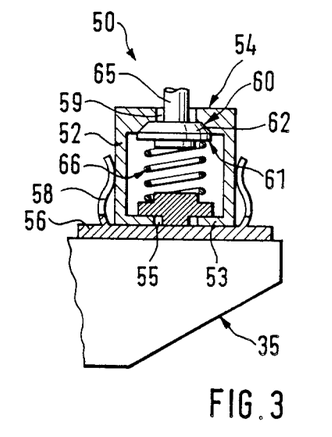
FIG. 3 is a view on an enlarged scale of the part indicated at III in FIG. 2 showing a holding element for connecting the measuring head to a movable upper portion of the apparatus.

As shown in FIG. 3, the holding elements 50 comprise U-shaped holding stirrup members 51 which are limitedly displaceable transversely with respect to the longitudinal extent of the bridge support 35. Flange portions 53 which are directed inwardly from the downwardly pointing free ends of the limbs 52 of the respective holding stirrup members 51 positively engage with clearance into grooves 55 in a respective holding plate 56 which is fixedly connected to one end of the bridge support 35 at the top thereof. The holding stirrup members 51 are held in a central position in relation to said holding plates 56 by means of leaf springs 58 which engage the limbs 52 of the holding stirrup member 51 on the outside thereof. The web portion 54 of the respective holding stirrup member 51 which interconnects the limbs 52 thereof and which is disposed in opposite relationship to the flanges 53 which positively co-operate with said holding plates 56 has an opening 59 extending therethrough. The opening 59 has a seat 60 of a tapering configuration at its underside. A holding plate portion 61 engages into the taper seat 60, with a mounting surface 62 of opposite taper configuration. The holding plate portion 61 is connected to a shank portion 65 which extends through said opening 59 and which is fixedly anchored in the movable upper portion 36 of the apparatus, at 64. A cylindrical coil spring 66 is accommodated in a prestressed condition within each holding stirrup member 51 between the holding plate portion 61 and the holding plate 56 which is connected to the bridge support 35 at its top side. The coil spring 66, in the operative position shown in FIG. 2, presses the holding plate portion 61 with its taper mounting surface 62 into the opposite-taper seat 60 in the web portion 54 of the holding stirrup member 51.

Figure 4:
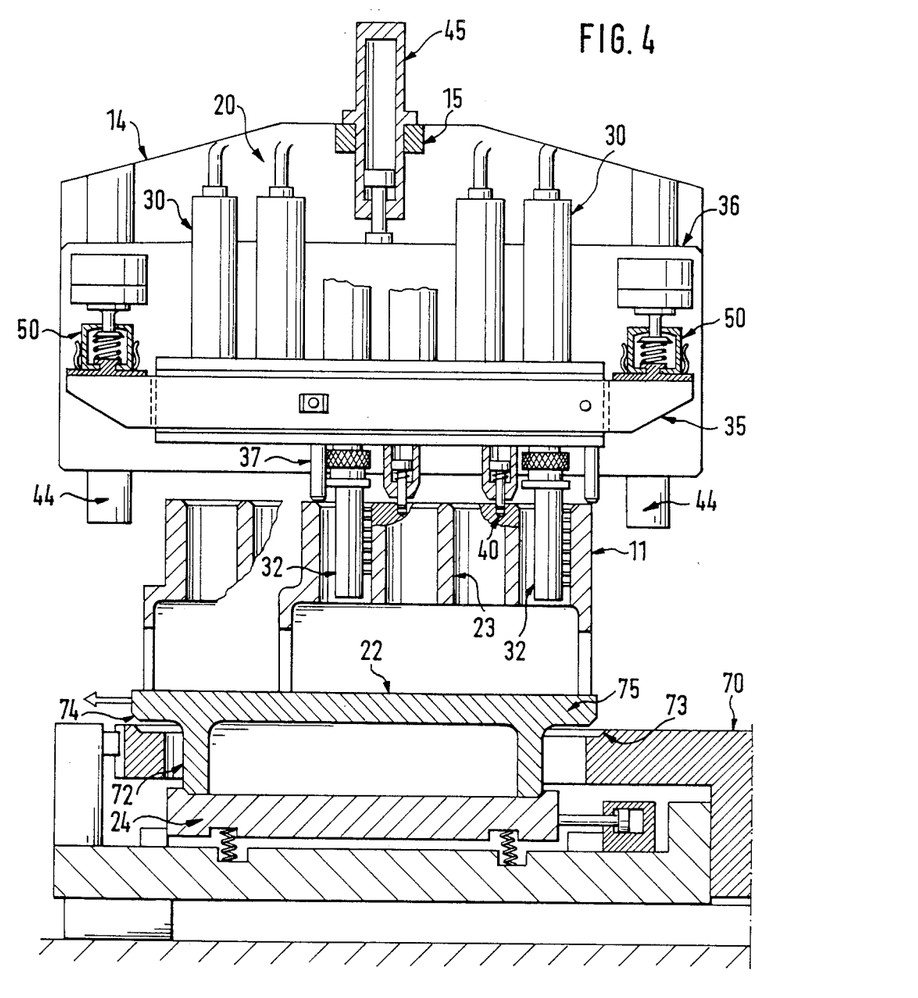
FIG. 4 is a view similar to that shown in FIG. 2, illustrating a part of the measuring station, with the measuring head lowered on to the engine block and with the measuring probes engaged into the cylinder bores to be measured in the engine block.
Figure 5:
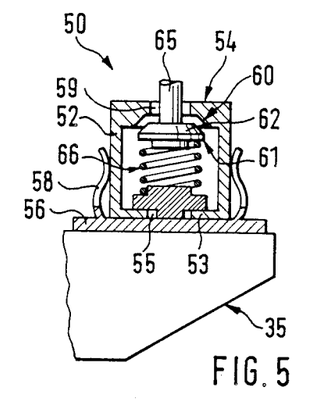
FIG. 5 is a view corresponding to that shown in FIG. 3 illustrating a holding element in the decoupled condition.

For the purposes of measuring the cylinder bores 23 of an engine block 11 which is disposed in the proper position in the measuring station 13, the upper portion 36 of the apparatus, with the measuring head 20, is lowered from the operative position shown in FIG. 2 until the spacer pins 37 which extend downwardly from the measuring head at the underside thereof are disposed immediately above the upper edge 38 of the engine block, but without touching same. In that situation the measuring probes 32 extend into the cylinder bores 23 to be measured, without contact in respect of the sensing pins 34 of the measuring sensors, which project radially from the measuring probes 32. After the above-described downward movement of the measuring head on to the workpiece and the resulting engagement of the measuring probes into the cylinder bores to be measured, the sensing pins 34 are brought into contact with the walls of the cylinder bores 23 by displacement of the measuring head 20 transversely with respect to the longitudinal extent of the measuring probes 32, in the direction indicated by the arrow 68, and in that position the index pins 40 are positively introduced into the index bores 41 which extend into the workpiece from the top side thereof, by means of actuation of the associated displacement units 39. After that transverse positioning operation, by a renewed downward movement of the upper portion 36 of the apparatus, the measuring head 20 is lowered until the spacer pins 37 bear against the upper edge 38 of the workpiece, and the measuring head is then decoupled by virtue of the holding plate portions 61 coming out of their positions of engagement with the taper mounting seats 60 in the web portions 54 of the holding stirrup members 51, and compressing the prestressed springs 66 by a predetermined amount so that the measuring head 20 is now decoupled in relation to the upper portion 36 of the apparatus and is pressed against the workpiece, in the measuring position of the measuring head as is defined by the spacer pins 37 and the index pins 40 which engage into the index bores 41 in the workpiece. FIG. 4 shows the measuring head in the condition of being decoupled from the upper portion 36 of the apparatus, in its measuring position in which it is associated with the workpiece in precise positional relationship and is pressed against same with a defined biasing force.

By virtue of the fact that the support plate 24 which carries the workpiece carrier 22 with the engine block 11 positioned thereon is carried on a resilient seating arrangement, the workpiece and the measuring head are decoupled from other apparatus members and the cylinder bores can be measured without suffering from the effect of external influences likely to cause errors and flaws, by a procedure in which the measuring probes 32 are caused to rotate by means of the rotary drive effect of their respective drive units 30 and the sensing pins 34 of the measuring probes sense the cylinder walls on axially adjacent parallel circles.

After the operation of measuring the cylinder bores 23 in a workpiece, the biasing force which is applied by the springs 66 in the holding stirrup members 51, which springs are compressed in the measuring position, is firstly removed by the upper portion 36 of the apparatus being moved up by such a distance that the taper contact surfaces of the holding plate portions 61 and the internal mounting seats 60 in the holding stirrup members 51 come into a condition of co-operating with each other and the spacer pins 37 lift off the upper edge 38 of the workpiece by a small distance. Thereupon, the index pins which engage into the index bores 41 in the workpiece are retracted, whereupon the measuring head 20 performs a transverse of movement which causes the sensing pins 34 to be lifted off the walls the cylinder bores 23, under the effect of the spring elements 58 which laterally engage the holding stirrup members 51. Thereupon the upper portion 36 of the apparatus, with the measuring head 20, can be raised into the position shown in FIG. 2.

Figure 6:
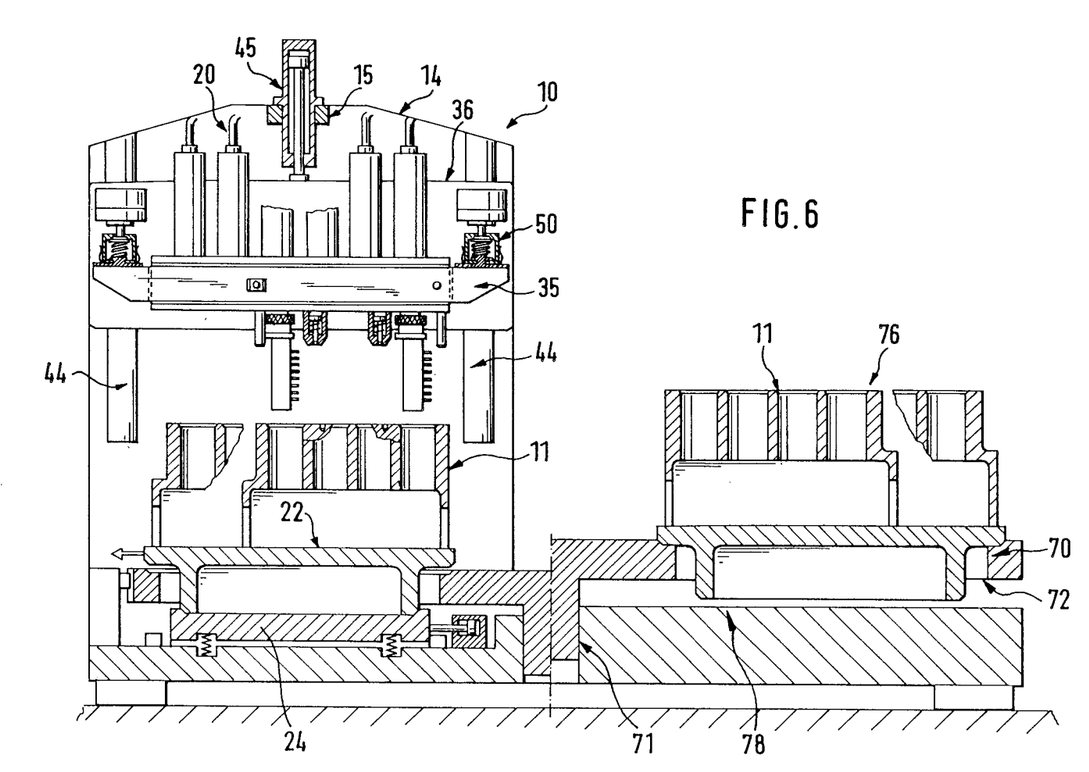
FIG. 6 is a view similar to that shown in FIG. 2 illustrating the way in which the engine blocks are supplied to and removed from the measuring station by means of a turntable.

The engine blocks are supplied to and removed from the measuring station 13 by a turntable 70 which is rotatable about a vertically extending axis at a spacing from the measuring station by means of a central mounting shaft portion 71. The turntable has two openings 72 which are arranged at 180° relative to each other and which have support surfaces 73 of a tapering configuration, for support surfaces 74, also of a tapering configuration, at the undersides of an upper plate portion 75 of the workpiece carrier 22. The turntable 70 is vertically movable between the raised position shown in the right-hand half of FIG. 6, and the lowered position shown in the left-hand half of FIG. 6. A workpiece carrier 22 is accommodated in each of the openings 72 in the turntable 70. In the raised position of the turntable 70, the workpiece carrier 22 is suspended at the taper mounting surfaces 73 of the opening in the turntable, whereas in the lowered position, in the measuring station 13, the workpiece carrier 22 is supported on the resiliently seated support plate 24 in the above-described manner, and is therefore no longer in contact with the turntable.

Disposed outside the measuring station is a loading and unloading station 76 in which the workpieces, disposed in a position in which they are turned through 180° relative to the position in the measuring station, are put on to the workpiece carrier 22 which is then standing on a base plate 78, and are disposed in the proper position. When then the turntable 70 is raised into the position shown in the right-hand half in FIG. 6, the taper mounting surfaces 73 of the openings 72 in the turntable pick up the workpiece carriers which are thus suspended therefrom. Rotation of the turntable 70 through 180° about its vertical axis then moves the workpiece carrier which is loaded with an engine block into the measuring station 13 from which that rotary movement removed the second workpiece carrier 22 with a previously measured engine block, which was thus moved by rotary movement into the loading and unloading station 76. By the turntable again being moved downwardly into the position shown in the left-hand half in FIG. 6, the workpiece carrier which is in the measuring station is supported at the mounting seat 27 of the support plate 24 and the workpiece carrier in the loading and unloading station is deposited on the base plate 78.

We claim:

1. A method for measuring the configuration of cylinder bores in workpieces, particularly engine blocks of internal combustion engines, comprising the steps: inserting into a cylinder bore at least one measuring probe of a measuring head without contacting the cylinder wall, said probe having measuring sensors spaced from each other in longitudinal direction of said probe, said sensors having sensing pins projecting radially beyond a peripheral surface of said probe without contacting the cylinder wall; displacing said probe and workpiece relative to one another transversely to the axis of the cylinder bore and bringing thereby said sensing pins into contact with the cylinder wall; fixing said measuring head in a fixed position relative to the workpiece; holding the fixed position by a force urging the measuring head and workpiece into mutual fixed positions; seating the workpiece resiliently and decoupling the measuring head from other neighboring elements for fixing said measuring head only relative to the workpiece; and sensing the cylinder wall by said sensing pins on adjacent parallel circles to measure the configuration of the cylinder bore.

2. An arrangement for measuring the configuration of cylinder bores in workpieces, particularly engine blocks of internal combustion engines, comprising: a measuring head with at least one measuring probe for insertion into a cylinder bore, said cylinder bore having a cylinder wall, said measuring probe being inserted into said cylinder bore without contacting said cylinder wall; measuring sensors on said probe and spaced from each other in longitudinal direction of said probe; said measuring sensors having sensing pins projecting radially beyond a peripheral surface of said probe without contacting said cylinder wall; means for displacing said probe and workpiece relative to one another transversely to an axis of said cylinder bore and bringing thereby said sensing pins into contact with said cylinder wall; means for fixing said measuring head in a fixed position relative to the workpiece; means for holding the fixed position by a force urging said measuring head and workpiece into mutual fixed positions; means for seating the workpiece resiliently and decoupling said measuring head from other neighboring elements to fix said measuring head in position only relative to the workpiece; said sensing pins sensing said cylinder wall on adjacent parallel circles to measure the configuration of the cylinder bore; motor drive means connected to said measuring probe and having said measuring sensors arranged at axial spacings from each other, each sensor having a respective sensing pin, said measuring head being advanceable in a measuring station to a workpiece receiving means, said measuring probe being insertable into said cylinder bore in the workpiece carried in said measuring station on the workpiece receiving means; said workpiece receiving means being resiliently seated in said measuring station during said measuring.

3. An arrangament as defined in claim 2, wherein said measuring head has positioning means cooperating positively with the workpiece in a measuring position of said measuring probe; and spacer means supported at predetermined points on the workpiece.

4. An arrangement as defined in claim 3, wherein said positioning means comprises index pins that can be fitted into index bores in the workpiece.

5. An arrangement as defined in claim 4, including actuating means connected to said index pins.

6. An arrangement as defined in claim 3, wherein said spacer means comprises spacer pins extending parallel to an axis of said measuring probe.

7. An arrangement as defined in claim 2, including a vertically movable upper support, decouplable holding elements for suspending said measuring head from said vertically movable upper support through said holding elements, said measuring head having limited positioning movements transversely to the longitudinal axis of said measuring probe when said holding elements are decoupled; and means for pressing said measuring head against the workpiece with a predetermined force when said holding elements are decoupled.

8. An arrangement as defined in claim 7, wherein said means for pressing said measuring head against the workpiece in a measuring position comprises springs compressed in the measuring position by a predetermined amount; and pressure elements arranged in said vertically movable upper support for biasing said spring means.

9. An arrangement as defined in claim 7, including a holding stirrup member in each holding element and connected to said measuring head in direction of advancement of said measuring head towards the workpiece; return means for applying a force against said stirrup member for limiting transverse displacement of said stirrup member; a coupling member fixedly connected to said movable upper support and cooperating with said holding stirrup member until said measuring head is applied to the workpiece and is disengaged from said holding stirrup member when said upper support moves downward.

10. An arrangement as defined in claim 9, wherein said return means comprises return springs engaging laterally said holding stirrup members, said return springs being supported on said measuring head.

11. An arrangement as defined in claim 9, including spring means for pressing said measuring head against the workpiece in a measuring position; pressure elements arranged on said upper support for compressing said spring means by a predetermined amount; said pressure elements comprising coupling members cooperating with said holding stirrup members; each coupling member having a pin connected to said vertically movable upper support and passing through an opening in an upper web of said holding stirrup member; and a holding plate connected to said pin and engaging into a mounting seat around said opening in said web portion, said holding plate being disengaged from said mounting seat when said measuring head is in a measuring position due to downward movement of said upper support.

12. An arrangement as defined in claim 11, including a spring in said holding stirrup member between said measuring head and associated holding plate for urging said holding plate into said mounting seat for pressing said measuring head against the workpiece in a measuring position.

13. An arrangement as defined in claim 2, wherein a plurality of probes are arranged in number and position dependent on cylinder bores to be measured in the workpiece.

14. An arrangement as defined in claim 13, including a bridge support decouplably and transversely displaceable suspended from said vertically movable upper support for receiving the measuring problems with respective drive units.

15. An arrangement as defined in claim 2, including a support plate for supporting said workpiece receiving means in said measuring station and being resiliently seated; and a precisions seat for mounting said workpiece receiving means on said support plate.

16. An arrangement as defined in claim 15, including a turntable for conveying said workpiece receiving means carrying a workpiece thereon between a loading and unloading station and said measuring station, said turntable having a vertical axis of rotation between said stations and being lowerable out of a transportation plane, said precision seat on said support plate comprising a first precision seat, said turntable in said transportation plane carrying said workpiece receiving means in suspended relationship in a second precision seat in a region of an opening in said table, said table in a lowered position carrying said workpiece receiving means in said first precision seat of said support plate, said workpiece receiving means being located on a base plate in said loading and unloading station and being decoupled from said turntable.

17. An arrangement as defined in claim 15, wherein said first and second precision seats have taper mounting means, said workpiece receiving means having mounting regions with opposite taper for mating with said taper mounting means, said mounting regions being arranged at vertical spacing from each other.

* * * * *